US007765123B2

(12) United States Patent
Shan et al.

(10) Patent No.: US 7,765,123 B2
(45) Date of Patent: Jul. 27, 2010

(54) INDICATING WHICH OF FORECASTING MODELS AT DIFFERENT AGGREGATION LEVELS HAS A BETTER FORECAST QUALITY

(75) Inventors: Jerry Z. Shan, Palo Alto, CA (US); Julie W. Drew, Redwood City, CA (US); Jose Luis Beltran Guerrero, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 11/879,979

(22) Filed: Jul. 19, 2007

(65) Prior Publication Data

US 2009/0024407 A1   Jan. 22, 2009

(51) Int. Cl.
G06F 17/00 (2006.01)
(52) U.S. Cl. .................................................. 705/10
(58) Field of Classification Search .............. 705/10
See application file for complete search history.

(56) References Cited

U.S. PATENT DOCUMENTS

| 5,676,690 | A | 10/1997 | Noren | |
| 5,893,069 | A * | 4/1999 | White, Jr. | 705/1 |
| 6,532,449 | B1 | 3/2003 | Goertzel | |
| 7,111,007 | B2 * | 9/2006 | Thier et al. | 707/100 |
| 7,200,505 | B2 | 4/2007 | Shan | |
| 7,369,961 | B2 | 5/2008 | Castelli | |
| 2002/0169658 | A1 | 11/2002 | Adler | |
| 2003/0018501 | A1 | 1/2003 | Shan | |
| 2005/0256759 | A1 | 11/2005 | Acharya | |
| 2006/0074817 | A1 | 4/2006 | Shan et al. | |
| 2006/0085234 | A1 * | 4/2006 | Cagan | 705/7 |
| 2006/0116920 | A1 | 6/2006 | Shan | |
| 2006/0116921 | A1 | 6/2006 | Shan | |
| 2007/0055604 | A1 | 3/2007 | Their et al. | |
| 2008/0221974 | A1 | 9/2008 | Gilgur | |
| 2009/0024427 | A1 | 1/2009 | Shan | |
| 2009/0024444 | A1 | 1/2009 | Shan | |
| 2009/0132347 | A1 * | 5/2009 | Anderson et al. | 705/10 |

OTHER PUBLICATIONS

Ouwehand, Pim; Forecasting with group seasonality; Technische Universiteit Eindhoven; v6801C; abstract only.*
K.B. Kahn, "Revisiting Top-Down Versus Bottom-Up Forecasting," The Journal of Business Forecasting, pp. 14-19 (Summer 1998).
M.A. Moon, "What is World Class Forecasting? A Perspective on 20 Years of Research," Proceedings of the 2005 Crystal Ball User Conference, pp. 1-4 (2005).
Smith et al; Cost estimation predictive modeling; regression versus neural network; Wntr, 1997; Engineering Economist, v42, n2, p137(25) (dialog classic copy) (15 pages).

(Continued)

Primary Examiner—Thomas Dixon

(57) ABSTRACT

To perform forecasting, a first data collection having data values at first intervals is received, and a first forecasting model is built based on the first data collection. A second forecasting model is built based on a second data collection having intervals aggregated from intervals of the first data collection, wherein the second forecasting model is at a different aggregation level than the first forecasting model. At least one metric is computed by performing at least one test based on at least one of the first and second data collections to indicate which of the first and second forecasting models has a better forecast quality.

24 Claims, 3 Drawing Sheets

OTHER PUBLICATIONS

Palma et al; Efficient estimation of Seasonal Long-Range-Dependent Processes; Nov. 2005; Journal of Time Series Analysis, v26n6, pp. 863-892; dialog abstract only (1 page).

Kifer et al., Detecting Change in Data Streams, Proceedings of the 30th VLDB Conference, Toronto, Canada 2004, pp. 180-191.

Shan, Jerry Z., U.S. Appl. No. 11/273,696 entitled "Detecting Data Change Based on Adjusted Data Values" filed Nov. 14, 2005 (32 pages).

* cited by examiner

INDICATING WHICH OF FORECASTING MODELS AT DIFFERENT AGGREGATION LEVELS HAS A BETTER FORECAST QUALITY

BACKGROUND

Conventionally, to perform data forecasting, users typically build a forecasting model from input data directly at the time interval level that is specified for the forecasting. For example, if a user desires to make a monthly forecast of sales, then monthly sales data is used directly to build a model; the model is then used in performing the forecast.

At the specified forecasting level (e.g., monthly forecasting level), historical data may exhibit irregular or unexplainable volatility, which may result in a derived forecasting model that may be incapable of capturing some of the key and hidden drivers that may be visible at a different time interval level (e.g., at a quarterly level). Consequently, users may develop forecasting models that produce inaccurate forecast data.

BRIEF DESCRIPTION OF THE DRAWINGS

Some embodiments of the invention are described with respect to the following figures.

DETAILED DESCRIPTION

Figure 1:
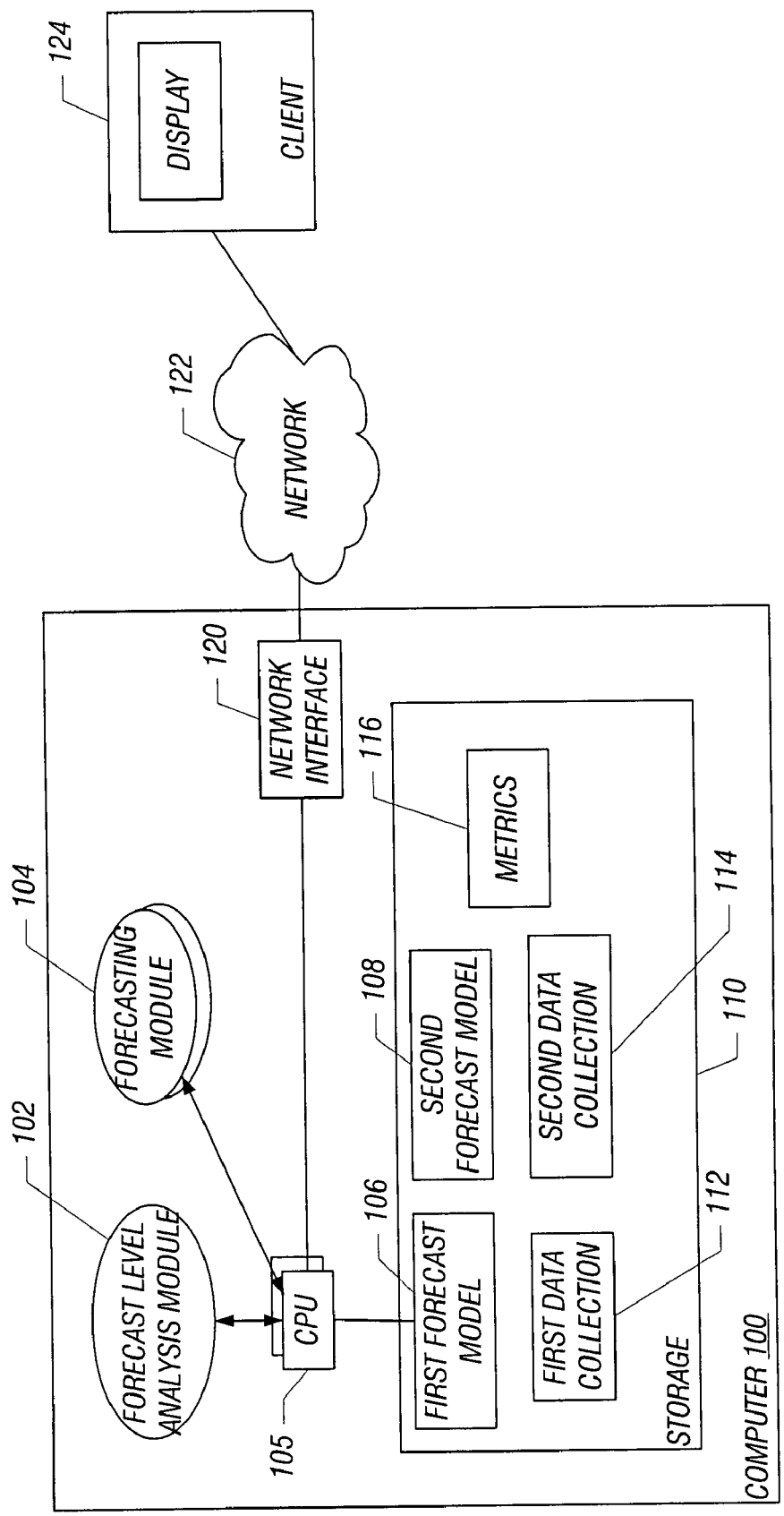
FIG. 1 is a block diagram of an example arrangement that includes a computer in which software is executable to perform tasks in accordance with an embodiment.

In accordance with some embodiments, forecasting at different aggregation levels (also referred to as "forecasting levels") is considered to identify which of the aggregation levels is likely to produce better forecasting results based on a data collection. A "data collection" refers to a group or set of data values along either discrete or continuous intervals (e.g., time intervals, location intervals, intervals defined as different products, etc.). A data collection can contain data associated with an enterprise, which can be a business, educational organization, or government agency. Examples of data in the data collection include sales data, profit data, revenue data, cost data, data relating to enrollment of students, data associated with operations of a government agency. An "aggregation level" or "forecasting level" refers to the level of intervals of data points at which the forecasting is to be made. For example, in the time dimension, forecasting can include hourly forecasting, weekly forecasting, monthly forecasting, quarterly forecasting, annual forecasting, and so forth, which correspond to aggregation levels of hours, weeks, months, quarters, years, and so forth. Thus, in the time dimension, the aggregation levels refer to different time intervals. Forecasting can also be made in other dimensions, such as in a product dimension (where the aggregation levels can include specific product models, product classes, etc.). Forecasting can also be based on geographic dimensions, such as forecasting according to cities, states, countries, and so forth. In general, at least a first aggregation level and a second aggregation level can be defined, where the second aggregation level can be an aggregate of the first aggregation level; in other words, the intervals of the second aggregation level are aggregated from intervals of the first aggregation level (e.g., quarters aggregated from months).

The analysis of which aggregation level will provide better forecasting results is an automated analysis, rather than a manual analysis performed by users. The automated analysis is based on forecast quality metrics produced and is also based on testing according to some embodiments. One type of test that is performed includes dividing a first data collection into a model sample part and a test sample part, where the model sample part of the first data collection is used to build a first model. The first model that is built is then used to produce forecast data into the intervals associated with the test sample part of the first data collection. The actual values of the test sample part are compared with the forecast values generated by the first derived model, and a forecast quality measure can be generated to indicate the quality of the forecast using the first derived model.

Additionally, the first data collection is aggregated to produce a second data collection at aggregated intervals. For example, the first data collection can include monthly data values at monthly intervals, whereas the second data collection that is based on aggregation of the first data collection can include quarterly data values at quarterly intervals. The second data collection (the aggregated data collection) is also separated into a model sample part and a test sample part, where the model sample part of the second data collection is used to generate a second derived model that is used to produce forecast values in the intervals associated with the test sample part of the second data collection. Again, the actual data values of the test sample part of the second data collection are compared to the forecast values produced by the second derived model to generate a second forecast quality measure. The above process can be repeated for higher aggregation levels (e.g., annual aggregation level, etc.), with a corresponding forecast quality measure calculated at each of the higher aggregation levels. The forecast quality level measures for the plural aggregation levels are compared to identify which of the aggregation levels will produce a better forecast.

In some embodiments, the testing performed above provides an initial assessment of which of multiple forecasting levels will provide a better forecast. In addition to the testing above, further testing can be performed, where the further testing includes performing statistical distribution tests using percentage values that are derived from the first data collection. The statistical distribution tests provide metrics that can be used to indicate which of multiple aggregation levels will provide better forecast results. The statistical distribution tests are discussed further below.

Based on the one or more metrics (e.g., forecast quality measures from the initial assessment or metrics generated by the statistical distribution tests) produced from one or more of the tests discussed above, forecasting at the appropriate level can be selected to achieve better forecast results.

In some cases, the testing discussed above is performed at a first location (such as at an analysis location of an enterprise, e.g., a business, educational organization, or government agency). A user at the analysis location can use the results of the testing to advise field locations (such as marketing analysts at various sales offices) which forecasting level to use to achieve better forecast results. For example, a field location may desire to perform planning cycles at the monthly level, which would mean that forecast data should be generated at the monthly level. However, an analyst at an analysis location of the enterprise may determine that it would be better to perform forecasting at the quarterly level, and advise the field analyst accordingly.

In some cases, forecasting at a higher aggregation level (e.g., quarterly level rather than monthly level) can produce better forecast results than forecasting at a lower aggregation level. For example, quarterly forecasting avoids the fluctuations that can occur from one month to the next month within a particular quarter. In one specific example, analysis of order or sales data may be performed on a quarterly basis rather than on a monthly basis, even though order data or sales data is often tallied on a monthly, weekly, or even daily basis.

FIG. 1 illustrates an example arrangement that includes a computer 100 that has a forecast level analysis module 102 and forecasting modules 104, which can be software modules executed on one or more central processing units (CPUs) 105. The forecast level analysis model 102 is executable to determine which of plural aggregation levels will produce a better forecast result.

The forecasting modules 104 are invoked to apply corresponding forecast models to produce forecast results. In the example depicted in FIG. 1, the forecast models include a first forecast model 106 and a second forecast model 108 stored in a storage 110 of the computer 100. More than two forecast models can be generated and stored in the storage 110. The forecast models 106 and 108 can be created by the forecast level analysis module 102 based on respective first and second data collections 112 and 114. The first data collection 112 has data values at first intervals (which can be time intervals or other types of intervals), and the second data collection 114 has data values at second intervals, which are aggregated from the first intervals. In one example, the intervals of the first data collection 112 are monthly intervals, whereas the intervals of the second data collection 114 are quarterly intervals aggregated from the monthly intervals (one quarter is equal to three months). A data collection having data values along time intervals is referred to as a time series.

In the ensuing discussion, reference is made to data collections (time series) in the time dimension. For time series, the forecasting performed is time-based forecasting to produce forecast data for future time intervals. Techniques according to some embodiments can also be applied for other types of data collections at different types of intervals, such as product intervals, geographic intervals, and so forth.

Based on the analysis performed by the forecast level analysis module 102, various metrics are derived for indicating which forecast levels are better to perform forecasting. Such metrics are added to a collection 116 of metrics stored in the storage 110. As discussed above, one type of metric is a forecast quality measure that is based on comparing actual data values with forecast data values (forecast based on a particular forecast model). Various forecast quality measures are produced for different forecast models at different aggregation levels, and these measures are compared to perform an assessment of which aggregation level is better for forecasting.

Another type of metric in the collection 116 is a predictability metric that is based on a statistical distribution test (discussed further below). The predictability metric is used to indicate whether a lower forecast level (lower aggregation level) would provide better predictability than a higher forecast level (higher aggregation level).

One or more of the metrics in the collection 116 can be communicated through a network interface 120 of the computer 100 and over a data network 122 to a client computer 124. Note that there can be multiple client computers connected to the data network 122 that are able to retrieve the metrics information. In one example, the metrics can be displayed in a display of the client computer 124. The computer 100 can be provided at an analysis location, whereas the client computer(s) 124 can be provided at field locations.

In an alternative implementation, rather than just display metrics, the metrics can be provided into a report (e.g., a table, chart, graph, text report, etc.), with the report communicated over the network 122 to the client computer 124. In an alternative implementation, a display can be directly attached to the computer 100 to allow for visualization of the metrics in the collection 116 or a report based on the metrics. In yet another implementation, the information communicated can include conclusions of which aggregation level to use for performing forecasts.

Figure 2A:
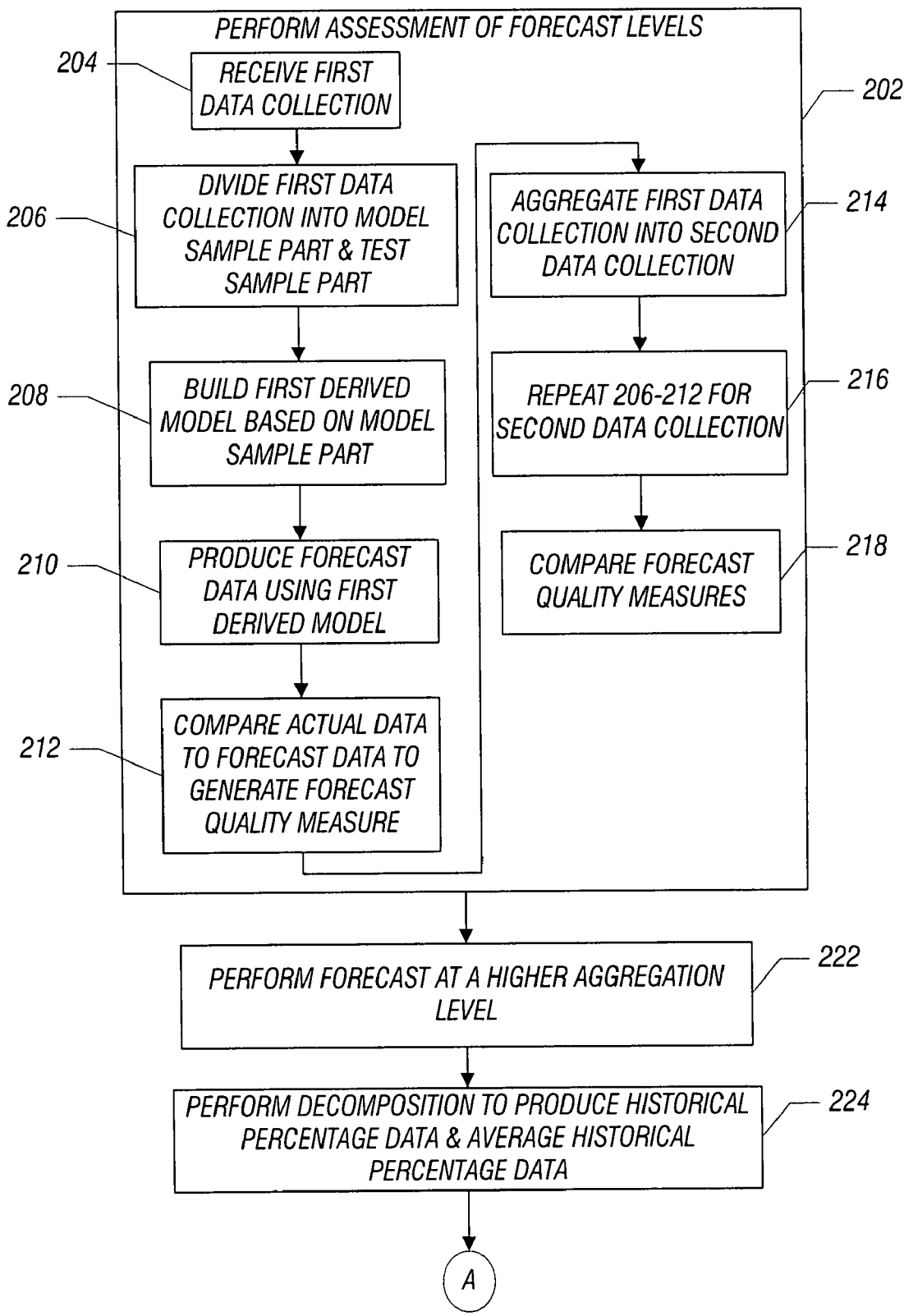
FIGS. 2A-2B depict a flow diagram of a process, according to an embodiment, of identifying which of plural time interval levels of forecasting would produce superior results.
Figure 2B:
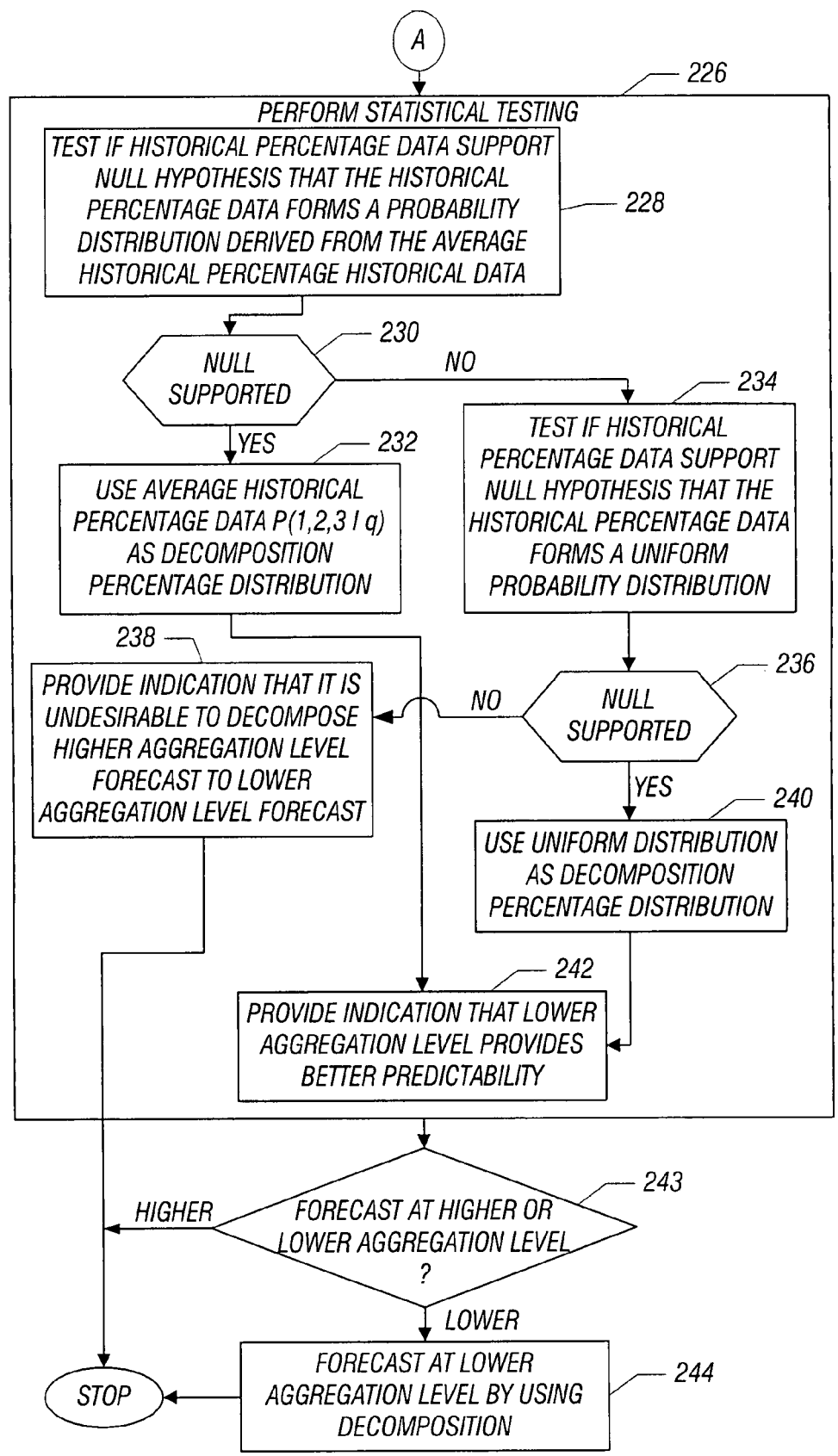

FIGS. 2A-2B depict a flow diagram of a process according to an embodiment. The forecast level analysis module 102 performs (at 202) an assessment of aggregation levels to determine which aggregation level is better for performing forecasting. In performing the assessment at 202, the forecast level analysis module 102 receives (at 204) the first data collection 112 (FIG. 1). The first data collection is divided (at 206) into a model sample part and a test sample part. In one example, if the first data collection is a time series, the time series is divided into two time windows. More generally, the model sample part contains data values of the first data collection in a first group of intervals, and the test sample part contains data values of the first data collection in a second group of intervals.

The forecast level analysis module 102 uses the model sample part of the first data collection to build (at 208) a first derived model (which is the first forecast model 106 of FIG. 1). The corresponding forecasting module 104 is then invoked to apply the first derived model on the model sample part to produce (at 210) sample data, where the sample data is predicted or forecast data at the intervals of the test sample part of the first data collection. For example, where the test sample part corresponds to a test time window, the predicted data includes data values in the test time window. Producing predicted data in the test sample part allows for a comparison (at 212) of the predicted data with the actual data of the test sample part of the first data collection, where the comparison generates a first forecast quality measure. One example forecast quality measurement that can be made is a measurement of a mean absolute percentage error (MAPE).

The first collection data is then aggregated (at 214) by the forecast level analysis module 102 into the second data collection 114, where the second data collection 114 contains data values at intervals that are aggregated from the intervals of the first data collection (e.g., quarterly intervals that are aggregates of monthly intervals).

The tasks of 206, 208, 210, and 212 are then repeated (at 216) for the second data collection. The repeated tasks include dividing the second data collection into a model sample part and test sample part, building a second derived model (e.g., second forecast model 108 of FIG. 1) based on the model sample part of the second data collection, producing predicted data using the second derived model, and comparing the actual data (test sample part of the second data collection) to the predicted data (generated using the second derived model) to generate another forecast quality measure.

If additional aggregation levels are to be considered, then tasks 214 and 216 can be further repeated to aggregate the second data collection into a third data collection, and so forth. Additional forecast quality measure(s) are then computed for the further aggregated data collection(s). Thus, for example, if the first data collection contains data values at monthly intervals, and the second data collection contains data values at quarterly intervals, another data collection can include data values at annual intervals.

The forecast quality measures corresponding to the multiple aggregation levels are compared (at 218) to determine which of the aggregation levels is better for performing forecasting. A result of the comparison can be provided.

The assessment performed at 204-218 is an initial assessment in some embodiments. In addition to the feedback provided by a comparison of forecast quality measures performed at 218, it is noted that another metric can also be used to perform further determination of the proper forecast level. This additional metric can be a predictability metric that is based on a statistical distribution test (task 228 or 234, discussed below). The predictability metric is produced by task 238 or 242, discussed below. Using the results of the comparing of forecast quality measures at 218 and the predictability metrics, it can be determined which aggregation level should be used to perform forecasting.

After performing the preliminary assessment (202) of the aggregation levels, the forecast level analysis module 102 invokes a forecasting module 104 (FIG. 1) to perform (at 222) a forecast, using a forecasting model, at a higher aggregation level. The forecasting model used to perform the forecast at 222 is a forecasting built based on the entire second data collection (rather than just the model sample part of the second data collection performed in the preliminary assessment of 202). The forecast at the higher aggregation level produces forecast data into forecast intervals (e.g., future time intervals). Note that whether the forecast data at the higher aggregation level, as performed at 222, or forecast data at a lower aggregation level is used is subject to determination based on the forecast quality measures computed at 202 and on metrics produced by statistical distribution testing.

To enable the performance of the statistical distribution testing, decomposition is performed (at 224), which produces percentage values that are to be used to derive decomposition data. As described further below, the decomposition data is used to decompose forecast data performed using forecasting at a higher aggregation level at 222 to produce forecast data at a lower aggregation level.

In performing the decomposition, the first data collection is processed to produce percentages. In the following discussion, the first data collection is assumed to include monthly data at monthly intervals. In each of the four quarters of a year, there are three months. Within each quarter, percentages are calculated for each month to produce historical monthly percentage data. The historical monthly percentage data can be represented as a vector having a length of three to correspond to the three months within the quarter. Each percentage value represents a monthly total value divided by the quarterly total value. For example, if the first month of a particular quarter has a monthly total data value that is 10% of the quarterly total, the second month of the quarter has a monthly total value that is 30% of the quarterly total, and the third month has a monthly value that is 60% of the quarterly total, then the historical monthly percentage data for this example would be: (0.1, 0.3, 0.6). The historical monthly percentage data for any particular quarter is represented as a vector of the following form: (p1, p2, p3), where p1, p2, and p3 are percentages.

In addition to the historical monthly percentage data, average historical monthly percentage data is also computed, and denoted as $P(1,2,3|q)$, where (1,2,3) represents the three months of quarter q. $P(1,2,3|q)$ is a vector of length 3, and the vector varies from quarter to quarter. Each percentage value of the vector $P(1,2,3|q)$ is calculated as an average (mean or median) or other aggregate of the quarter q over all years contained within the historical data collection (in this case, the first data collection). Thus, for example, the value for the first position of vector $P(1,2,3|q)$ for quarter 3 (q=3) would be a mean or median of all first month percentage values of quarter 3 over all years of the historical data collection.

For example, assume that the first data collection (historical data collection) has monthly data available over five years. There is a quarter 3 in each of the five years. The value for the first position of $P(1,2,3|q)$ for quarter 3 (q=3) is an average (or other aggregate) of the following: percentage value of month 1 in quarter 3 of year 1; percentage value of month 1 in quarter 3 of year 2; percentage value of month 1 in quarter 3 of year 3; percentage value of month 1 in quarter 3 of year 4; and percentage value of month 1 in quarter 3 of year 5.

In an alternative implementation, if there does not exist annual seasonality or if there is insufficient yearly data, the average historical monthly percentage data can be computed over all available quarters. In this case, the average historical monthly percentage data is represented as: $P(1,2,3)$, which is not conditioned on which quarter the three months are in.

Next, in the process of FIGS. 2A-2B, statistical testing is performed (at 226). Statistical testing refers to a statistical distribution test on the percentage data computed at 224. Examples of statistical distribution tests include chi-squared tests, Kolmogorov-Smirnov tests, and other statistical tests.

A first statistical distribution test tests (at 228) if the historical monthly percentage data, (p1, p2, p3), from each applicable historical quarter, supports the null hypothesis that the three percentage values p1, p2, p3 form a probability distribution derived from the average historical monthly percentage data $P(1,2,3|q)$ or $P(1,2,3)$. Note that $P(1,2,3|q)$ for quarter q defines a probability distribution that is an average of monthly data values for quarter q in multiple years. Assume, for example, that $P(1,2,3|q)$ for quarter 3 (q=3) is (0.15, 0.45, 0.4). The test performed at 228 in this example is to test if the historical percentage data (p1, p2, p3) in quarter 3 of each of years 1-5 follows the distribution (0.15, 0.45, 0.4).

The forecast level analysis module 102 next determines (at 230) if the null hypothesis is supported. The null hypothesis is supported if the historical monthly percentage data follows the distribution derived from the average historical monthly percentage data. If the null hypothesis is supported, the average historical monthly percentage data $P(1,2,3|q)$ or $P(1,2,3)$ can be used as the decomposition percentage distribution, which is the distribution to be applied to the forecast data that is generated at a higher aggregation level (222 in FIG. 2A) to decompose into forecast data for a lower aggregation level.

If the null hypothesis as determined at 230 is not supported, then another test is performed, which tests (at 234) if the historical monthly percentage data supports the null hypothesis that the three values of the historical monthly percentage data (p1, p2, p3) forms a uniform probability distribution. The uniform probability distribution, represented as (⅓, ⅓, ⅓), indicates that the monthly values for the three months are equal in any particular quarter. The forecast level analysis module 102 determines (at 236) if the null hypothesis of the test at 234 is supported. If so, the uniform distribution (⅓, ⅓, ⅓) is used (at 240) as the decomposition percentage distribution. However, if the null hypothesis of the test at 234 is not supported, as determined at 236 (which means that both tests 228 and 234 have resulted in a negative result), an indication is provided (at 238) that it is undesirable to decompose the higher aggregation level forecast to a lower aggregation level forecast. It is noted that the uniform distribution test (234) can be carried out conditional on a fixed quarter, as for the computed average percentage distribution tests (228). In a more practical setting where the number of historical years is relatively small (hence the sample size is small), or the computed average percentage distribution tests conditional on fixed quarters do not support their null hypotheses (the "no" branch of diamond 230), the uniform distribution test should be performed unconditionally on any fixed quarter, which would use an effectively larger sample size and increase the testing and inference power.

If either of the null hypotheses for the tests at 228 and 234 is supported, then an indication is provided (at 242) that the lower aggregation level provides better predictability. The indications of 238 and 242 are predictability metrics that can be used in conjunction with the forecast quality measures discussed above to determine which aggregation level to use for forecasting. The statistical testing performed at 226 also outputs a decomposition percentage distribution, represented as DP(1,2,3).

Next, it is determined (at 243) if the higher or lower aggregation level is to be used for forecasting. If the comparison of the quality measures (218) and the predictability metrics indicate that forecasting is to be performed at a lower aggregation level, then a forecast is performed (at 244) at a lower aggregation level based on the forecast data from the forecast at the higher aggregation level (222 in FIG. 2A) by using decomposition based on the decomposition percentage distribution. The decomposition percentage distribution, DP(1,2,3), is applied to the forecast data, F, produced at 222 as follows: F*DP(1,2,3), where DP(1,2,3) is equal to one of P(1,2,3|q), P(1,2,3), or (⅓, ⅓, ⅓), depending on which null hypothesis was supported in the statistical testing performed at 226. Note that multiplying the decomposition percentage distribution DP(1,2,3) with F constitutes a forecasting model at the lower aggregation level. In other words, DP(1,2,3)*F represents the forecasting model at the lower aggregation level. The forecasting model at the lower aggregation level is based on percentage data calculated from the first collection data (historical data collection).

Note also that the forecasting models of tasks 222 and 244 are different from the forecasting models used during the initial assessment task (202) for deriving forecasting quality measures for different aggregation levels.

If the determination (243) indicates that the forecast is to be performed at the higher aggregation level, then the forecast data from the forecast at 222 is used. Forecasting at a higher aggregation level can avoid fluctuation that may occur at lower intervals. Thus, for example, performing forecasting at the quarterly level may avoid the effect of fluctuation between months. One example cause for such fluctuation may be that companies perform their order or sales operations on a quarterly basis rather than on a monthly basis, even though order data or sales data is tallied on a monthly, weekly, or even daily basis. On the other hand, if the metrics computed in accordance with some embodiments indicate that forecasting at the lower aggregation level would produce more accurate results, then techniques according to some embodiments allow for flexibility in performing the forecasting at the lower aggregation level rather than the higher aggregation level.

Instructions of software described above (including the forecast level analysis module 102 and forecasting modules 104 of FIG. 1) are loaded for execution on a processor (such as one or more CPUs 105 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method executed by a computer of performing forecasting, comprising:

receiving a first data collection having data values at first intervals;

building, by the computer, a first forecasting model based on the first data collection;

building, by the computer, a second forecasting model based on a second data collection having intervals aggregated from intervals of the first data collection, wherein the second forecasting model is at a different aggregation level than the first forecasting model; and computing, by the computer, metrics by performing tests on the first and second data collections to determine which of the first and second forecasting models has a better forecast quality.

2. The method of claim 1, wherein computing the metrics comprises computing a first forecast quality measure for the first forecasting model and a second forecast quality measure for the second forecasting model.

3. The method of claim 2, further comprising comparing the first and second quality measures to determine which of the first and second forecasting models will provide better forecast quality.

4. The method of claim 2, wherein computing the first forecast quality measure comprises:

dividing the first data collection into a first part and a second part, wherein the first forecasting model is built from the first part;

generating predicted data using the first forecasting model;

comparing the predicted data to actual data in the second part to derive the first forecast quality measure, and wherein computing the second forecast quality measure comprises:

dividing the second data collection into a first part and a second part, wherein the second forecasting model is built from the first part of the second data collection;

generating predicted data using the second forecasting model; and comparing the predicted data generated using the second forecasting model with actual data in the second part of the second data collection to derive the second forecast quality measure.

5. The method of claim 1, further comprising:

building a third forecasting model based on a third data collection having intervals aggregated from the intervals of the second data collection, wherein the third forecasting model is at a higher aggregation level than the aggregation level of the second forecasting model; and computing at least another metric to indicate whether the third forecasting model will provide a better forecast quality than the first and second forecasting models.

6. The method of claim 1, wherein performing the tests comprises performing a statistical distribution test.

7. The method of claim 6, wherein performing the statistical distribution test comprises performing a test that determines whether percentage values based on data in the first data collection support a null hypothesis that the percentage values form a predetermined probability distribution.

8. The method of claim 7, further comprising computing an aggregate of percentage values corresponding to the first data collection, wherein the predetermined probability distribution is based on the aggregate of the percentage values.

9. The method of claim 8, wherein computing the aggregate comprises computing one of a median and mean of the percentage values corresponding to the first data collection.

10. The method of claim 8, wherein the aggregate of the percentage values provides decomposition percentage data,
wherein building the first forecasting model comprises building a forecasting model that applies the decomposition percentage data to forecast data produced by the second model.

11. The method of claim 7, wherein performing the statistical distribution test further comprises:
in response to determining that the percentage values based on data in the first data collection do not support a null hypothesis that the percentage values form the predetermined probability distribution, defining a uniform probability distribution and performing a test that determines whether the percentage values based on data in the first data collection support a null hypothesis that the percentage values form the uniform probability distribution.

12. The method of claim 11, further comprising:
if the percentage values based on data in the first data collection support the null hypothesis that the percentage values form the uniform probability distribution, using the uniform probability distribution as decomposition percentage data,
wherein building the first forecasting model comprises building a forecasting model that applies the decomposition percentage data to forecast data produced by the second forecasting model.

13. The method of claim 1, wherein building the first and second forecasting models and computing the metrics are part of an initial assessment task, the method further comprising performing statistical distribution testing after the initial assessment task for determining which of the first and second forecasting models has a better forecast quality.

14. The method of claim 13, wherein building the second forecasting model is based on a part of the second data collection, and wherein building the first forecasting model is based on a part of the first data collection, the method further comprising:
building another forecasting model based on an entirety of the second forecasting model; and
using the another forecasting model to generate forecast data at a higher aggregation level.

15. The method of claim 14, further comprising decomposing the forecast data generated using the another forecasting model using decomposition data to produce forecast data at a lower aggregation level.

16. The method of claim 1, wherein receiving the first data collection comprises receiving the first data collection containing one of sales data, profit data, revenue data, cost data, data relating to enrollment of students, and data associated with operations of a government agency.

17. The method of claim 1, wherein the second data collection contains aggregated data values that are aggregated from the data values of the first data collection in the corresponding aggregated intervals.

18. A method executed by a computer of performing forecasting, comprising:
receiving a first data collection having data values at first intervals;
performing, by the computer, statistical testing on the first data collection to derive a metric for indicating whether forecasting is to be performed at the first intervals of the first data collection or at second intervals based on aggregating the first intervals;
in response to the metric indicating that forecasting is to be performed at the first intervals, applying, by the computer, a first forecasting model to produce forecast data at the first intervals; and
in response to the metric indicating that forecasting is to be performed at the second intervals, applying, by the computer, a second forecasting model on a second data collection that has data values at the second intervals.

19. The method of claim 18, wherein applying the first forecasting model comprises decomposing forecast data produced by the second forecasting model.

20. The method of claim 19, wherein decomposing the forecast data comprises multiplying decomposition percentage data by the forecast data produced by the second forecasting model.

21. A computer-readable storage medium storing instructions that when executed cause a computer to:
receive a first data collection having data values at first intervals;
build a first forecasting model based on the first data collection;
build a second forecasting model based on a second data collection having intervals aggregated from intervals of the first data collection, wherein the second forecasting model is at a different aggregation level than the first forecasting model; and
compute at least one metric by performing at least one test based on at least one of the first and second data collections to indicate which of the first and second forecasting models has a better forecast quality.

22. The method of claim 18, wherein receiving the first data collection comprises receiving the first data collection containing one of sales data, profit data, revenue data, cost data, data relating to enrollment of students, and data associated with operations of a government agency.

23. The computer-readable storage medium of claim 21, wherein the second data collection contains aggregated data values that are aggregated from the data values of the first data collection in the corresponding aggregated intervals.

24. The computer-readable storage medium of claim 21, wherein performing the at least one test comprises performing a statistical distribution test.

* * * * *